United States Patent [19]

Wells et al.

[11] Patent Number: 5,038,897
[45] Date of Patent: Aug. 13, 1991

[54] PISTON AND PISTON ROD SUBASSEMBLY FOR A HYDRAULIC DAMPER

[75] Inventors: Joel R. Wells, Huber Heights; Daniel P. Zaenglein, Centerville, both of Ohio

[73] Assignee: General Motors Corporation, Detroit, Mich.

[21] Appl. No.: 502,717

[22] Filed: Apr. 2, 1990

[51] Int. Cl.$^5$ .............................................. F16F 9/54
[52] U.S. Cl. .............................. 188/311; 188/322.22; 92/255; 403/274
[58] Field of Search ...................... 188/322.15, 322.22, 188/315, 280; 92/255, 256; 403/274, 284, 279; 29/436, 597

[56] References Cited

U.S. PATENT DOCUMENTS

| | | | |
|---|---|---|---|
| 2,507,266 | 5/1950 | Patriquin | 188/88 |
| 3,724,615 | 4/1973 | Stormer | 188/322 |
| 3,901,359 | 8/1975 | Jentsch | 188/269 |
| 3,981,380 | 9/1976 | Andre | 188/282 |
| 4,298,102 | 11/1981 | Nishikawa et al. | 188/319 |
| 4,396,098 | 8/1983 | Petrak | 188/280 |
| 4,831,916 | 5/1989 | Leigh-Monstevens et al. | 92/129 |

Primary Examiner—Robert J. Oberleitner
Assistant Examiner—Christopher Schwartz
Attorney, Agent, or Firm—A. Michael Tucker

[57] ABSTRACT

A piston and piston rod subassembly for use with a hydraulic damper is disclosed. The piston is formed from a substantially flat blank having a pattern of bendable tabs provided along a first edge. A bendable skirt is provided along a second edge of the blank. After the blank is formed into a cylindrical body, the tabs are crimped onto a flanged end of a piston rod. A valve assembly can be retained in the cylindrical body by crimping the skirt over the valve assembly.

10 Claims, 2 Drawing Sheets

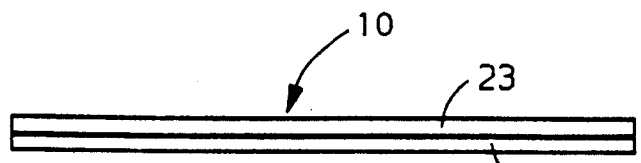
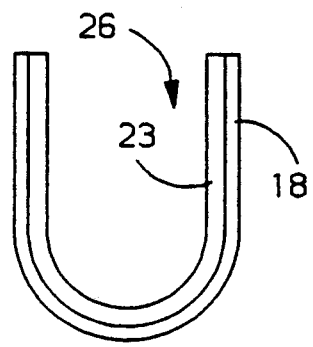
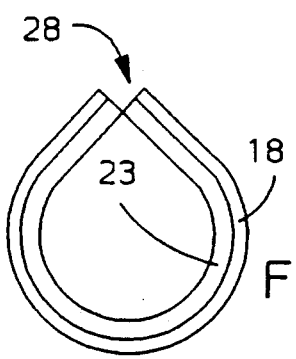
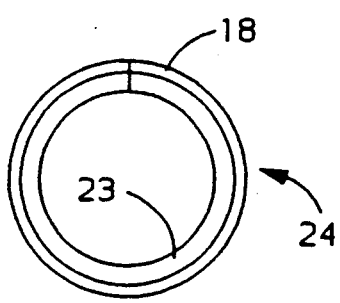
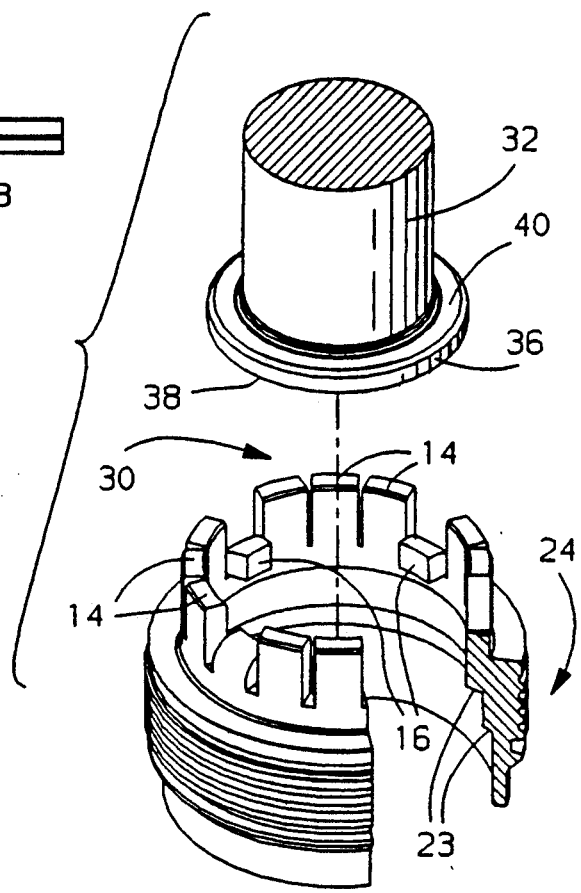
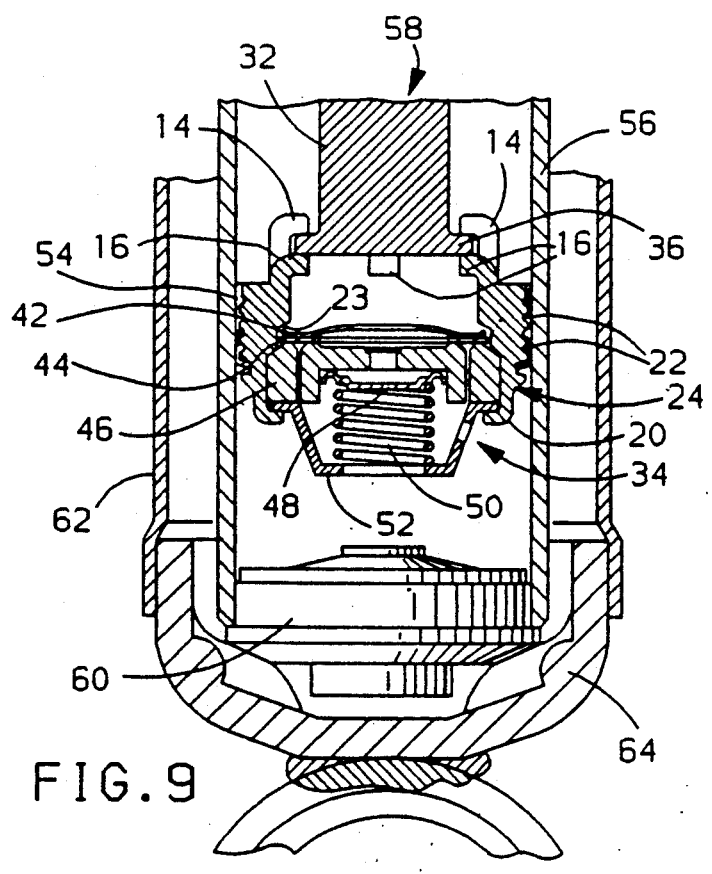

5,038,897

PISTON AND PISTON ROD SUBASSEMBLY FOR A HYDRAULIC DAMPER

BACKGROUND OF THE INVENTION

1. Field of the Invention

The present invention relates generally to hydraulic dampers for vehicles and, in particular, is concerned with a piston and piston rod subassembly and a method of manufacture and assembly.

2. Description of the Related Art

A typical hydraulic shock absorber or strut includes a piston and piston rod subassembly which reciprocates in an inner cylinder during compression and rebound of the damper. The piston may contain a valving package to vary the flow of hydraulic fluid from first and second chambers in the inner cylinder, resulting in desired damping characteristics.

The piston is generally formed as a solid cylindrical member requiring several machining and cutting operations. An inner passage is bored through the piston to receive the valving package and permit the flow of fluid. Oftentimes, the valving package is retained within the piston by a crimping procedure. A sealing band can be provided around the outer circumference of the piston to provide a seal against the inner surface of the inner cylinder. In other constructions, a piston can be formed by various elements into a substantially cylindrical package capable of reciprocating in the inner cylinder.

In the majority of shock absorbers and struts, the piston is either mounted on a threaded piston rod or welded to the piston rod. Drawbacks can occur with either one of these mounting techniques. Threading a piston rod increases manufacturing and assembly costs. Furthermore, the joint between the piston and the rod can become loose during operation. An example of a threaded piston rod can be found in U.S. Pat. No. 3,901,359.

While welding a piston to the rod may be less expensive than threading the rod, the heat generated by the welding process can distort the piston and its concentricity. Lack of concentricity can cause a piston to bind as the rod reciprocates in a damper, resulting in a defective unit. Second, weld spatter can become attached on and may adversely affect the valving, thereby interfering with fluid flow. Also, heat from the welding operation to attach the piston to the rod may damage the sealing band provided on the outer circumference of the piston. An example of a welded piston can be found in U.S. Pat. No. 3,724,615.

While conventional piston and piston rod subassemblies are successfully utilized, the art continues to seek improvements. It is desirable to provide a piston housing for containing a valving package which can be economically mounted on the piston rod without damaging the piston. Specifically, it is desirable to provide a piston and piston rod subassembly without the expense of current threading operations and/or the potentially adverse effects of welding.

SUMMARY OF THE INVENTION

The present invention includes a piston and piston rod subassembly for a hydraulic damper and a method of manufacturing the subassembly. The present subassembly can be utilized with conventional shock absorbers and struts and can receive conventional piston valving elements. The piston is secured to the piston rod without a threading operation or a welding process.

In a preferred embodiment, the present invention includes a piston and piston rod subassembly for use with a hydraulic damper. The piston is formed from a substantially flat blank having a pattern of bendable tabs provided along a first edge. A bendable skirt is provided along a second edge of the blank. After the blank is formed into a cylindrical body, the tabs are crimped onto a flanged end of a piston rod. A valve assembly can be retained in the cylindrical body by crimping the skirt over the valve assembly.

BRIEF DESCRIPTION OF THE DRAWINGS

FIG. 4 is a reduced edge or side view of the formed blank of FIG. 1.

FIG. 5 is a side view of the formed blank illustrating a first strike in a die progression.

FIG. 6 is a side view of the formed blank illustrating a second strike in the die progression.

FIG. 7 is a side view of the formed blank illustrating a third strike in the die progression resulting in a cylindrical piston housing.

FIG. 8 is an exploded perspective view of the present piston and piston rod subassembly illustrating the piston housing of FIG. 7 partially illustrated in section and a flanged piston rod.

FIG. 9 is a sectional view of the present piston and piston rod subassembly mounted in a shock absorber.

DETAILED DESCRIPTION OF THE PREFERRED EMBODIMENT

Figure 1:
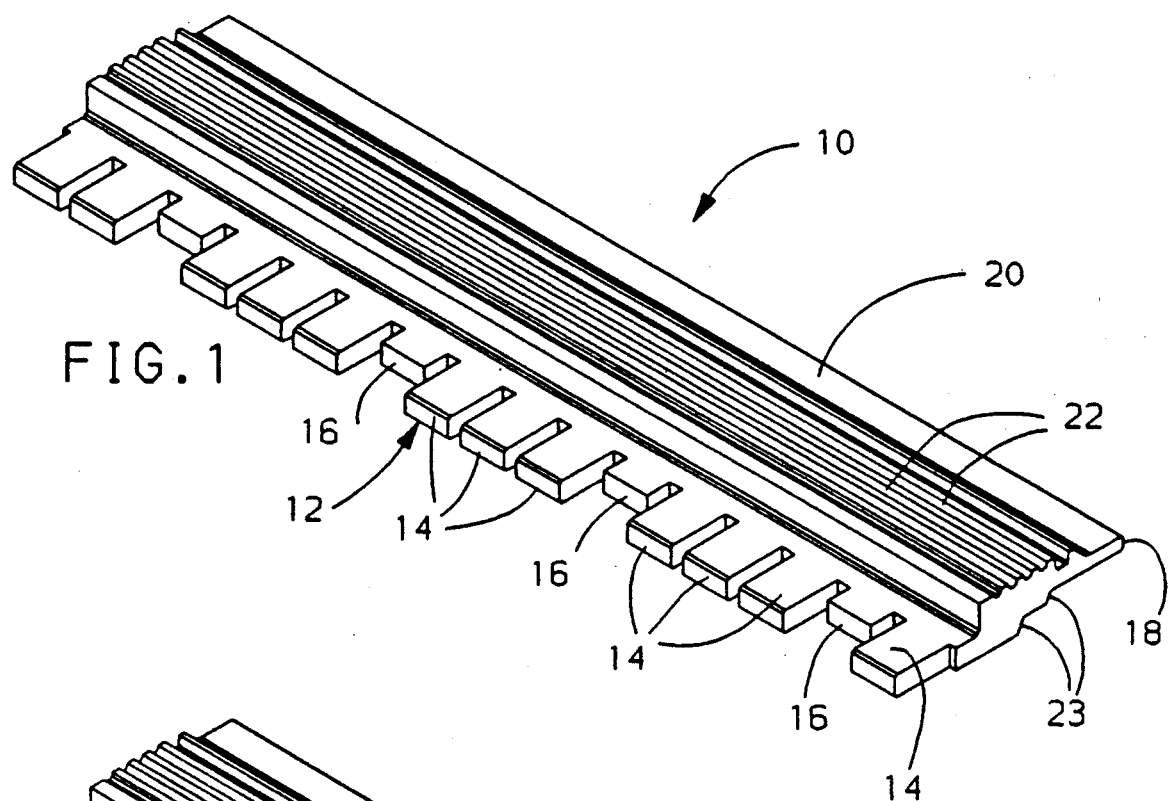
FIG. 1 is a perspective view of a first embodiment of the present formed blank prior to striking and illustrating a first tab pattern.

A substantially rectangular, formed blank indicated generally at 10 is illustrated in FIG. 1. The blank 10 can be formed from conventional strip stock and is cut to a finite length. The thickness and material of the blank 10 permit bending or deformation as described below.

As viewed in FIG. 1, the front or upper edge 12 of the blank 10 is cut in a pattern of long tabs 14 and short tabs 16. Each tab 14 and 16 is formed so as to be bendable. Preferably, each tab 14 and 16 can be bent approximately perpendicular to the plane of the blank 10 as described below.

The long and short tabs 14 and 16 can vary as desired. In particular, the lengths of the long tabs 14, as well as the lengths of the short tabs 16, can differ in various embodiments of the blank 10. Furthermore, the distance between the tabs 14 and 16 can vary and the pattern of tabs 14 and 16 can be varied. For example, in the embodiment of FIG. 1, a pattern of three long tabs followed by a short tab 16 is repeated along the length of the upper edge 12. A rolling stock (not illustrated) of the pattern can be cut as desired between two adjacent long tabs 14 or between a long tab 14 and a short tab 16. In any pattern selected, the thickness and material of the tabs 14 and 16 permit bending or deformation as described below.

Figure 2:
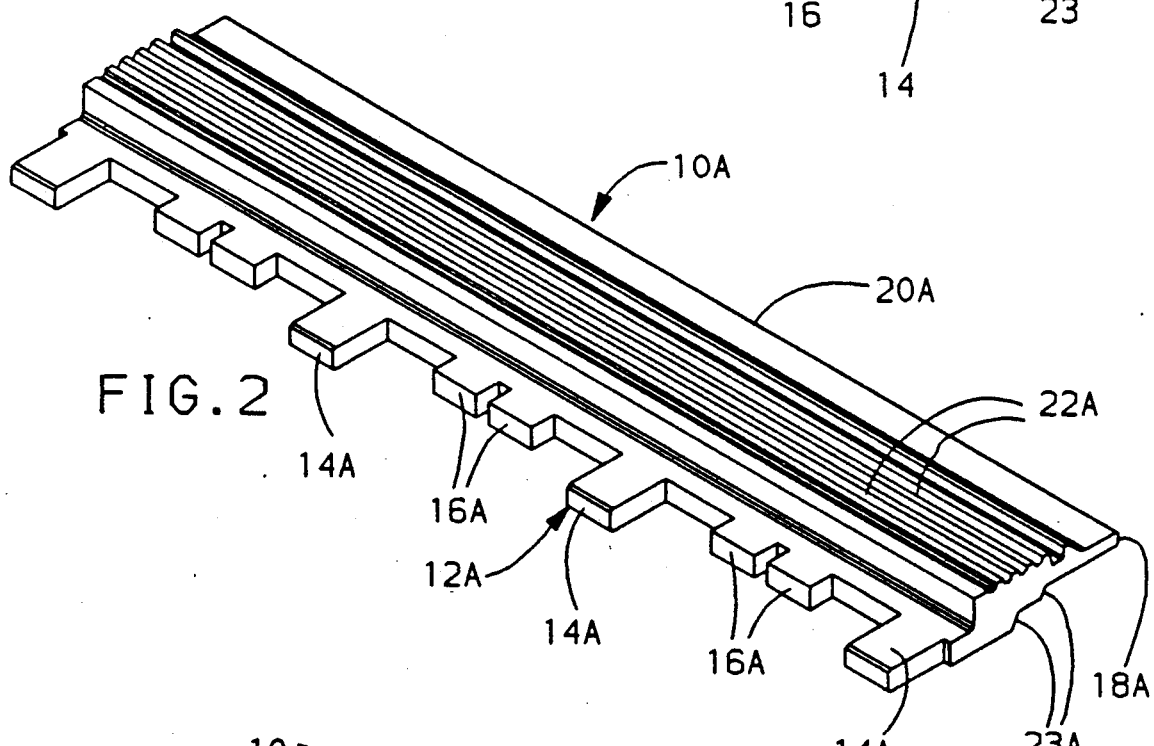
FIG. 2 is a perspective view similar to FIG. 1 illustrating an alternate tab pattern on the formed blank.
Figure 3:
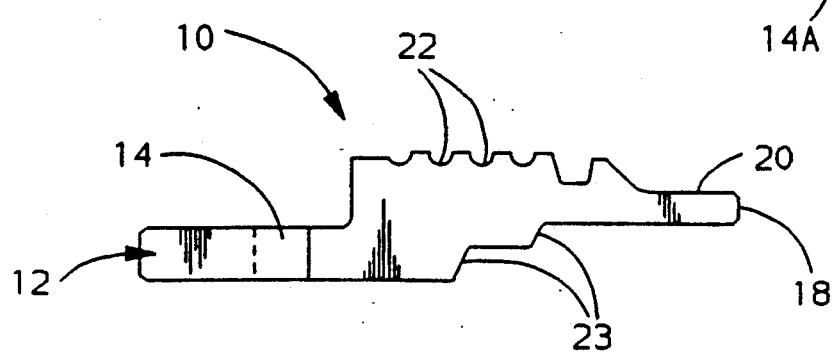
FIG. 3 an enlarged end view of the formed blank of FIG. 1.

In a second embodiment illustrated in FIG. 2, a blank 10A has a pattern of one long tab 14A followed by two short tabs 16A. Note that the distances between tabs 14A and 16A vary from similar elements in blank 10.

Other elements of blank 10A are similar to blank 10 and are designated with like reference numerals followed by the letter "A". Additional embodiments of the pattern of long and short tabs are easily envisioned. Also, a plurality of equally spaced tabs of a single height can be provided.

A rear or lower edge 18 of the blank 10 is provided with a skirt 20. The thickness and material of the skirt 20 permit bending or deformation as described below.

If desired, a plurality of ridges 22 can be provided on an outer surface of the blank 10. The ridges 22 are formed by any suitable means along the length of the blank 10 between the tabs 14 and 16 and the skirt 20. A valve seat 23 in the form of two steps is provided on an inner surface of the blank 10.

In FIG. 4, the blank 10 is turned on its upper edge 12 so that only the lower edge 18 and valve seat 23 are illustrated. FIGS. 5, 6 and 7 illustrate successive steps of a forming process wherein the flat blank 10 is formed into a cylindrical piston housing 24 (FIG. 7). In the first strike of the process, the blank 10 is bent to form a U-shaped member 26. The strike can be accomplished by any suitable means, including a male punch and a female die. After a second strike illustrated in FIG. 6, the U-shaped member 26 is formed into a rounded member 28. Upon a third strike, a continuously round, cylindrical piston housing 24 is produced. It is appreciated that the illustrative steps of FIGS. 5, 6 and 7 can be combined, and that other methods may be used to form the blank 10 into the piston housing 24.

An unassembled piston and piston rod subassembly indicated generally at 30 is partially illustrated in FIG. 8. The piston housing 24 is a hollow member for receiving a piston rod 32 and a valve assembly 34 (FIG. 9). The piston rod 32 is formed with an annular flange 36 at its lower end. Preferably, the diameter of the flange 36 is slightly less than the smallest inner diameter of the piston housing 24.

The tabs 14 and 16 are bent or crimped to retain the piston housing 24 on the piston rod 32. First, the short tabs 16 are bent or crimped inwardly to form a seat for a lower surface 38 of the flange 36. Second, the piston rod 32 is positioned so that the lower surface 38 of flange 36 rests on bent short tabs 16 as illustrated in FIG. 9. Third, the long tabs 14 are bent or crimped inwardly over a top surface 40 of the flange 36 to retain the piston housing 24 to the piston rod 32. It is appreciated that the short tabs 16 must be of a minimum height dependent upon the diameter of the flange 36 so that when bent inwardly they collectively form a seat for the lower surface 38 of the flange 36. Also, the long tabs 14 must be a minimal height to extend over the top surface 40 of the flange 36.

A well-known fluid valve assembly 34 can be retained by the piston housing 24 for selectively varying the fluid flow. The valve assembly 34 includes a compression intake valve spring 42 mounted on the internal valve seat 23 of the piston housing 24. An annular compression intake valve 44 is placed adjacent the valve spring 42, followed by an orifice plate 46. A rebound valve 48 is adapted to be supported on the opposite surface of the orifice plate 42 and controlled by a compression spring 50. A valve cage 52 is compressed against the spring 50. The skirt 20 is bent or crimped inwardly over the valve cage 52 to retain the components of the valve assembly 34 inside the piston housing 24. A sealing band 54, preferably formed from TEFLON, is retained by the grooves 22 on the outer circumference of the piston housing 24.

The piston and piston rod subassembly 30 are reciprocally mounted in the inner cylinder 56 of a hydraulic damper 58 partially illustrated in FIG. 9. The inner cylinder 56 is closed at its lower end by a well-known base valve assembly 60. A reservoir tube 62 closed at its lower end by an end cap 64 contains the inner cylinder 56. As the piston and piston rod subassembly 30 reciprocate, fluid travels through the piston valve assembly 34 and base valve assembly 60 in a well-known manner.

The pattern of tabs 14 and 16 can be varied as needed to provide fluid openings through the piston housing 24. For example, the lengths of the short tabs 16 can be reduced to allow fluid to flow more easily through the piston housing 24. In a similar manner, the distance between adjacent tabs 14 and 16 can be increased to provide less restricted fluid flow through the piston housing 24. It is appreciated that fluid passages can be provided through the piston rod 32.

The present piston housing 24 having bendable tabs 14 and 16 provides an economical connection to the present flanged rod 32 without expensive threading or the inherent problems of welding. The piston and piston rod assembly 30 can be used with known fluid valving and can be utilized with conventional shock absorbers and struts.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A hydraulic damper for use with a vehicle, comprising:
    a) a reservoir tube;
    b) an inner cylinder mounted in the reservoir tube;
    c) a piston rod reciprocally mounted in the inner cylinder and terminating in a flared, innermost end; and
    d) a cylindrical piston having upper and lower edges, the upper edge including a pattern of spaced-apart bendable tabs, wherein a first group of the tabs are bent radially inwardly to form a seat for the flared end of the piston rod and a second group of the tabs are crimped about the flared end of the piston rod to secure the piston onto the rod.

2. The damper as specified in claim 1 including a valving assembly housed within the piston.

3. The damper as specified in claim 1 wherein spaces between the tabs provide passages to permit fluid to flow through the piston as the piston reciprocates in the inner cylinder.

4. The damper as specified in claim 1 wherein the first group of tabs are shorter than the second group of tabs.

5. The damper as specified in claim 1 wherein the first group of tabs are bent approximately perpendicular to an axis of the cylindrical piston.

6. A piston and piston rod subassembly for use with a damper, the subassembly comprising:
    a) a piston rod having a flanged innermost end;
    b) a cylindrical piston body having first and second ends; and
    c) a pattern of spaced-apart bendable tabs formed at the first end of the piston body, wherein a first group of the tabs are bent radially inwardly to form a seat for the piston rod flange and a second group of the tabs are crimped around the piston rod flange to attach the piston body to the piston rod.

7. The subassembly as specified in claim 6 including:
a) a valve assembly slidably received into the second end of the piston body; and
b) an annular skirt formed at the second end of the body and crimped inwardly to retain the valve assembly within the body.

8. The subassembly as specified in claim 6 wherein spaces between the tabs provide passages to permit fluid to flow through the piston body as the piston body reciprocates in a damper.

9. The subassembly as specified in claim 6 wherein the first group of tabs are shorter than the second group of tabs.

10. The subassembly as specified in claim 6 wherein the first group of tabs are bent approximately perpendicular to an axis of the piston body.

* * * * *